(12) United States Patent
Wu et al.

(10) Patent No.: US 10,468,099 B2
(45) Date of Patent: Nov. 5, 2019

(54) CIRCUIT STRUCTURE AND DRIVING METHOD THEREOF, CHIP AND AUTHENTICATION METHOD THEREOF, AND ELECTRONIC DEVICE

(71) Applicant: Tsinghua University, Beijing (CN)

(72) Inventors: Huaqiang Wu, Beijing (CN); Yachuan Pang, Beijing (CN); Bin Gao, Beijing (CN); He Qian, Beijing (CN)

(73) Assignee: Tsinghua University, Beijing (CN)

(*) Notice: Subject to any disclaimer, the term of this patent is extended or adjusted under 35 U.S.C. 154(b) by 0 days.

(21) Appl. No.: 16/132,931

(22) Filed: Sep. 17, 2018

(65) Prior Publication Data
US 2019/0088325 A1    Mar. 21, 2019

(30) Foreign Application Priority Data
Sep. 18, 2017  (CN) .......................... 2017 1 0840926

(51) Int. Cl.
| G11C 11/00 | (2006.01) |
|---|---|
| G11C 13/00 | (2006.01) |
| H04L 9/32 | (2006.01) |
| H01L 27/24 | (2006.01) |
| G09C 1/00 | (2006.01) |

(52) U.S. Cl.
CPC ............ *G11C 13/0059* (2013.01); *G09C 1/00* (2013.01); *G11C 13/004* (2013.01); *G11C 13/0026* (2013.01); *G11C 13/0028* (2013.01); *H01L 27/2463* (2013.01); *H04L 9/3278* (2013.01); *G11C 2013/0057* (2013.01)

(58) Field of Classification Search
CPC ............ G11C 13/0059; G11C 13/0026; G11C 13/0028; G11C 13/004; G11C 2013/0057; H01L 27/2463
See application file for complete search history.

(56) References Cited

U.S. PATENT DOCUMENTS

| 8,289,752 B2* | 10/2012 | Lu ...................... G11C 13/0007 365/100 |
|---|---|---|
| 10,157,669 B2* | 12/2018 | Johnson ............. G11C 13/0069 |
| 10,164,182 B1* | 12/2018 | Trinh ...................... H01L 45/12 |

* cited by examiner

*Primary Examiner* — Pho M Luu
(74) *Attorney, Agent, or Firm* — Fish & Richardson P.C.

(57) ABSTRACT

A circuit structure for implementing a physical unclonable function and a driving method thereof, an integrated circuit chip and an authentication method thereof, an electronic device are disclosed. The circuit structure includes: a multilayer circuit, a first address circuit and an output circuit, the multilayer circuit includes a first RRAM device array which is addressable and a second RRAM device array which is addressable; the first address circuit is configured to map a resistance value of a second RRAM device in the second RRAM device array to a first address; the first address is used for positioning a selected first RRAM device; and the output circuit is configured to acquire and process a resistance value of the selected first RRAM device and output a processing result.

20 Claims, 6 Drawing Sheets

CIRCUIT STRUCTURE AND DRIVING METHOD THEREOF, CHIP AND AUTHENTICATION METHOD THEREOF, AND ELECTRONIC DEVICE

CROSS-REFERENCE TO RELATED APPLICATION

The present application claims priority of the Chinese Patent Application No. 201710840926.5, filed on Sep. 18, 2017, the disclosure of which is incorporated herein by reference in its entirety as part of the present application.

TECHNICAL FIELD

The embodiments of the present disclosure relate to a circuit structure for implementing a physical unclonable function (PUF) and a driving method thereof, an integrated circuit (IC) chip and an authentication method thereof, an electronic device.

BACKGROUND

With the rapid development of information technology, hardware such as smart cards and radio frequency identification are more and more widely applied. Hardware security faces many threats from a plurality of aspects, for instance, hardware Trojan horse, intellectual property piracy, integrated circuit reverse engineering, side channel attack and the like. Therefore, hardware security authentication has become a research hotspot in a security field. A physical unclonable function (PUF) is considered as a feasible technical proposal for hardware security protection due to the advantages such as true randomness, reproducibility, reliability and compatibility with micro-nano processing techniques.

SUMMARY

At least one embodiment of the present disclosure provides a circuit structure for implementing a physical unclonable function (PUF), comprising: a multilayer circuit, a first address circuit and an output circuit, the multilayer circuit includes a first storage circuit unit and a second storage circuit unit; the first storage circuit unit includes a first RRAM (Resistance Random Access Memory) device array which is addressable; the second storage circuit unit includes a second RRAM device array which is addressable; the first address circuit is configured to map a resistance value of a second RRAM device in the second RRAM device array to a first address; the first address is used for positioning a selected first RRAM device; and the output circuit is configured to acquire and process a resistance value of the selected first RRAM device and output a processing result.

For example, in the circuit structure for implementing the physical unclonable function provided by an embodiment of the present disclosure, the first address circuit is configured to map resistance values of at least two second RRAM devices in the second RRAM device array to the first address.

For example, in the circuit structure for implementing the physical unclonable function provided by an embodiment of the present disclosure, resistance values of respective first RRAM devices in the first RRAM device array are uniformly and discretely distributed within a first predetermined resistance range; and resistance values of respective second RRAM devices in the second RRAM device array are uniformly and discretely distributed within a second predetermined resistance range.

For example, in the circuit structure for implementing the physical unclonable function provided by an embodiment of the present disclosure, the first address includes a first row address and a first column address.

For example, in the circuit structure for implementing the physical unclonable function provided by an embodiment of the present disclosure, the first address circuit includes a row address mapping sub-circuit and a column address mapping sub-circuit; the row address mapping sub-circuit is configured to generate the first row address; and the column address mapping sub-circuit is configured to generate the first column address.

For example, in the circuit structure for implementing the physical unclonable function provided by an embodiment of the present disclosure, the first address circuit includes a sense amplifier and/or an analog-to-digital converter.

For example, in the circuit structure for implementing the physical unclonable function provided by an embodiment of the present disclosure, the analog-to-digital converter is configured to adopt a parallel mapping method to implement address mapping; and the sense amplifier is configured to adopt a serial mapping method to implement address mapping.

For example, in the circuit structure for implementing the physical unclonable function provided by an embodiment of the present disclosure, the output circuit includes a comparison sub-circuit, the comparison sub-circuit is configured to compare the resistance value of the selected first RRAM device with a reference resistance value and output a resistance comparison result, and the resistance comparison result is the processing result.

For example, the circuit structure for implementing the physical unclonable function provided by an embodiment of the present disclosure further comprises a second address circuit, the second address circuit is configured to receive a second address and position a selected second RRAM device according to the second address; and the first address circuit is configured to map a resistance value of the selected second RRAM device to the first address.

For example, in the circuit structure for implementing the physical unclonable function provided by an embodiment of the present disclosure, in a case of applying a same operation voltage, resistance values of at least two first RRAM devices in the first RRAM device array are different from each other, and resistance values of at least second RRAM devices in the second RRAM device array are different from each other.

For example, in the circuit structure for implementing the physical unclonable function provided by an embodiment of the present disclosure, the first RRAM device array includes a plurality of first threshold voltages, and the second RRAM device array includes a plurality of second threshold voltages; and the same operation voltage is less than a minimum first threshold voltage among the plurality of first threshold voltages and a minimum second threshold voltage among the plurality of second threshold voltages.

At least one embodiment of the present disclosure further provides an integrated circuit (IC) chip, comprising the circuit structure for implementing the physical unclonable function according to any one of the above-described.

At least one embodiment of the present disclosure further provides an electronic device, comprising the integrated circuit chip according to any one of the above-described.

For example, the electronic device provided by an embodiment of the present disclosure further comprises a controller. The controller is configured to control to output of a challenge signal; and the integrated circuit chip is configured to receive the challenge signal and generate and output an actual response signal according to the challenge signal.

For example, the electronic device provided by an embodiment of the present disclosure further comprises a comparator. The controller is further configured to control to output a target response signal corresponding to the challenge signal; and the comparator is configured to: receive the target response signal and the actual response signal; compare the target response signal with the actual response signal; and output a response signal comparison result.

At least one embodiment of the present disclosure further provides a driving method of the circuit structure for implementing the physical unclonable function, the circuit structure comprises: a multilayer circuit, a first address circuit and an output circuit, wherein the multilayer circuit comprises a first storage circuit unit and a second storage circuit unit; the first storage circuit unit comprises a first RRAM device array which is addressable; the second storage circuit unit comprises a second RRAM device array which is addressable; the first address circuit is configured to map a resistance value of a second RRAM device in the second RRAM device array to a first address; the first address is used for positioning a selected first RRAM device; and the output circuit is configured to acquire and process a resistance value of the selected first RRAM device and output a processing result, and the driving method comprises: acquiring an address of the second RRAM device array; positioning a selected second RRAM device in the second RRAM device array according to the address of the second RRAM device array; mapping a resistance value of the selected second RRAM device to the first address; positioning the selected first RRAM device according to the first address; and acquiring and processing the resistance value of the selected first RRAM device, and outputting the processing result.

For example, in the driving method provided by an embodiment of the present disclosure, mapping the resistance value of the selected second RRAM device to the first address includes: applying a same operation voltage to the selected second RRAM device; comparing a current flowing through the selected second RRAM device with a reference current group to obtain a current comparison result; and determining the first address according to the current comparison result.

For example, in the driving method provided by an embodiment of the present disclosure, acquiring and processing the resistance value of the selected first RRAM device includes: acquiring the resistance value of the selected first RRAM device and a reference resistance value; comparing the resistance value of the selected first RRAM device with the reference resistance value to obtain a resistance comparison result; and outputting the resistance comparison result, and the resistance comparison result being the processing result.

At least one embodiment of the present disclosure further provides an authentication method of an integrated circuit chip, the authentication method is applied to the integrated circuit chip according to any one of the above-described, and the authentication method comprises: acquiring a challenge signal and a target response signal corresponding to the challenge signal; sending the challenge signal to the integrated circuit chip; generating and outputting an actual response signal by the integrated circuit chip according to the challenge signal; and judging whether the actual response signal is identical with the target response signal or not, if so, determining that the integrated circuit chip is true, and if not, determining that the integrated circuit chip is false.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly. In order to make the following description of the embodiments of the present disclosure clear and concise, the present disclosure omits detailed description of known functions and known components.

At present, a physical unclonable function (PUF) is a hardware function implementation circuit that relies on chip features, has uniqueness and randomness, and achieves a function that a challenge signal and a response signal correspond to each other uniquely, by extracting deviation of process parameters that must be introduced in a chip manufacturing process. The PUF can be applied to fields such as intellectual property protection, dependable computing, hardware authentication system and key generation. The PUF may include an arbiter PUF, a ring oscillator PUF, a single-layer resistance random access memory PUF, etc. Most of these PUFs singly reuse the same unit to generate an output, resulting in that data complexity is low, and a certain data correlation between challenge-response pairs (CRPs) is existed. Because machine learning algorithms are applicable for extracting associations that are difficult to find in data, the machine learning algorithms are widely used to attack PUFs. The arbiter PUF has been proven to be unable to resist machine learning algorithm attacks, and other PUFs used for authentication are also threatened by machine learning algorithm attacks.

In order to generate a large CRP space by using less hardware consumption, the PUFs for authentication mostly adopt a technical solution of reusing data sources. For instance, the PUF of a single-layer resistance random access memory (RRAM) uses a proposal of randomly selecting two units at a time to generate one bit output. By adopting the proposal, a large number of non-repetitive outputs can be obtained by using fewer RRAM units. However, the same RRAM unit can be used in different outputs, resulting in a certain data association between the different outputs. The attacker only needs to obtain a certain proportion of outputs, use the machine learning algorithm to extract the association between the outputs, and then can accurately predict other outputs, thus the application prospect of the PUF in the hardware security field is hindered.

Compared with the arbiter PUF, using a single-layer RRAM array to output data through the differential method can improve the data complexity to a certain extent, but the attack results by using machine learning algorithms show that when the number of attacks increases, the security of the data will still gradually decrease. Therefore, improving the capability of the PUF in resisting attacks by machine learning algorithms has become an urgent need for the current PUF application.

At least one embodiment of the present disclosure provides a circuit structure for implementing a physical unclonable function (PUF) and a driving method thereof, an integrated circuit chip and an authentication method thereof, and an electronic device. The circuit structure for implementing the PUF implements the PUF on the basis of a multilayer RRAM array, and is connected to the RRAM device arrays in various layers by an address mapping method, so as to increase the data complexity, improve the capability of the PUF in resisting machine learning algorithm attacks, solve the problem that the PUF for authentication cannot resist the attacks by machine learning algorithms, and improve the security of hardware authentication.

Figure 1:
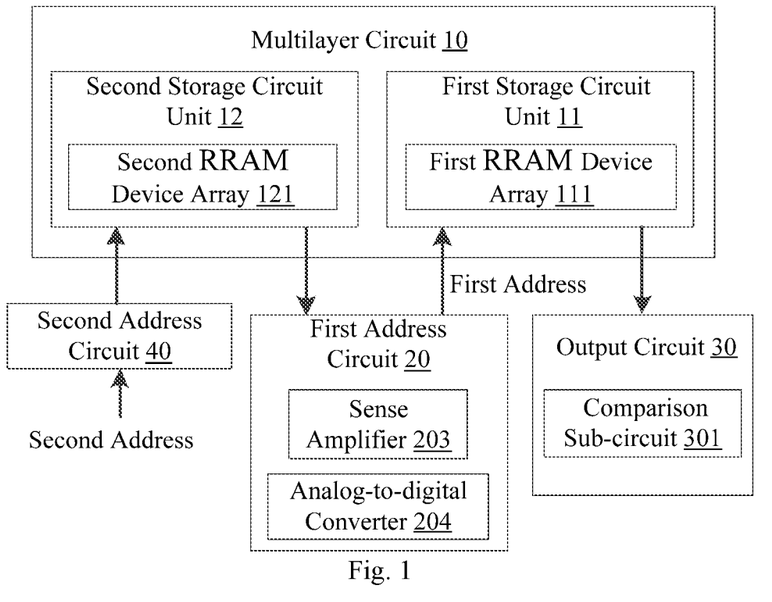
FIG. 1 is an architecture block diagram of a circuit structure for implementing a physical unclonable function provided by an embodiment of the present disclosure.
Figure 2:
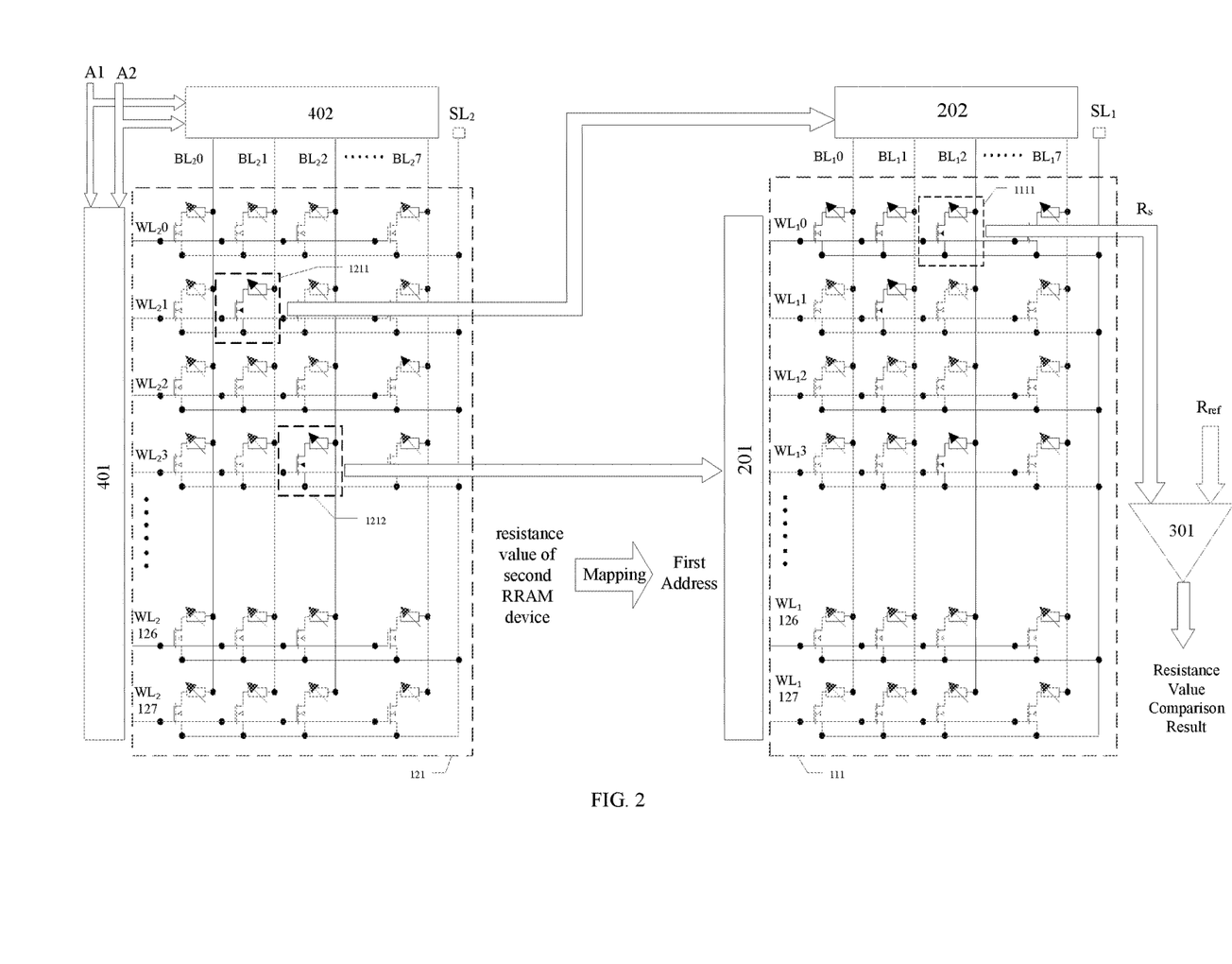
FIG. 2 is a schematic structural diagram of a circuit structure for implementing the physical unclonable function provided by an embodiment of the present disclosure.

FIG. 1 is an architecture block diagram of a circuit structure for implementing a physical unclonable function provided by an embodiment of the present disclosure, and FIG. 2 is a schematic structural diagram of a circuit structure for implementing the physical unclonable function provided by an embodiment of the present disclosure.

For instance, as shown in FIG. 1, the circuit structure for implementing the PUF provided by the embodiment of the present disclosure comprises: a multilayer circuit 10, a first address circuit 20 and an output circuit 30. The multilayer circuit 10 may include a plurality of storage circuit units. The plurality of storage circuit units, for instance, include a first storage circuit unit 11 and a second storage circuit unit 12. The first storage circuit unit includes a first RRAM device array 111 which is addressable. The second storage circuit unit includes a second RRAM device array 121 which is addressable. The first address circuit 20 is configured to map a resistance value of a second RRAM device in the second RRAM device array 121 to a first address, and the first address is used for positioning a selected first RRAM device 1111. The output circuit 30 is configured to acquire and process a resistance value of the selected first RRAM device 1111, and output a processing result.

For instance, the first storage circuit unit 11 is a first-layer circuit, and the second storage circuit unit 12 is a second-layer circuit. It should be noted that the first storage circuit unit 11 and the second storage circuit unit 12 do not represent layers in physical sense and only indicate different circuit regions.

The circuit structure for implementing the PUF provided by the embodiment of the present disclosure implements the PUF based on a multilayer RRAM array, and is connected to the RRAM arrays in various layers by an address mapping method, so as to increase the data complexity, improve the capability of the PUF in resisting machine learning algorithm attacks, solve the problem that the PUF for authentication cannot resist machine learning algorithm attacks, and improve the security of hardware authentication.

For instance, the plurality of storage circuit units may further include a third storage circuit unit, a fourth storage circuit unit and the like, so as to further increase the data complexity and improve the capability of the PUF in resisting attacks by machine learning algorithms. For instance, the third storage circuit unit includes a third RRAM device array which is addressable, and the fourth storage circuit unit includes a fourth RRAM device array which is addressable. A resistance value of a fourth RRAM device in the fourth RRAM device array may be mapped to a third address, and the third address is used for positioning a selected third RRAM device. A resistance value of the selected third RRAM device may be mapped to a second address, and the second address is used for positioning a selected second RRAM device. A resistance value of the selected second RRAM device may be mapped to the first address. The address mapping relationships of the plurality of storage circuit units are similar. In the following description of the present disclosure, an operation process of the multilayer circuit 10 will be described in detail by taking a case that the multilayer circuit 10 includes the first storage circuit unit 11 and the second storage circuit unit 12 as an example. However, those skilled in the art should know that the operation process is also applicable to other storage circuit units in the multilayer circuit 10.

For instance, both the first RRAM device and the second RRAM device are resistance random access memories (RRAMs). For instance, the RRAM may include a stacked electrode-dielectric layer-electrode structure, namely the dielectric layer is disposed between two electrodes. Materials of the electrodes may be metal materials such as gold (Au), platinum (Pt), tungsten (W), nickel (Ni), copper (Cu) or aluminum (Al), and may also be some special conductive materials such as titanium nitride (TiN). A material of the dielectric layer may be single-layer metal oxide, perovskite type compound or the like, and may also be a stacked layer of multiple materials, e.g., a stacked layer of hafnium oxide (HfOx) and aluminum oxide (AlOy). The metal oxide may include tantalum oxide (TaOx), hafnium aluminum oxide (HfAlyOx), tantalum pentoxide ($Ta_5O_2$), vanadium dioxide ($VO_2$) or niobium dioxide ($NbO_2$).

Figure 3:
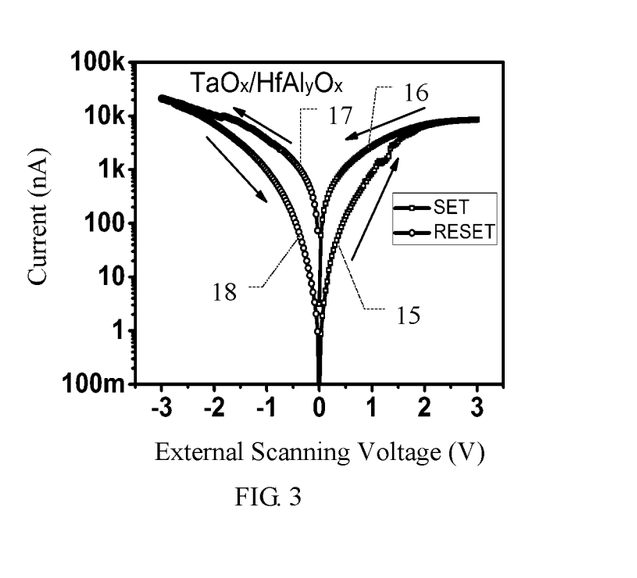
FIG. 3 is a schematic diagram illustrating electrical properties of a resistance random access memory.

For instance, a property of the RRAM is that a resistance value of the dielectric layer will change under an external applied voltage. FIG. 3 is a schematic diagram illustrating electrical properties of a resistance random access memory. As shown in FIG. 3, the horizontal coordinate represents an external scanning voltage applied to the RRAM, and the vertical coordinate represents the logarithm of a measured current. When a set voltage (namely a forward voltage) and a reset voltage (namely a reverse voltage) are applied to the RRAM, the resistance value of the RRAM changes differently. It should be noted that: if the RRAM is a bipolar RRAM (for instance, the structure of the bipolar RRAM is upper electrode-metal oxide stacked layer-lower electrode), applying the set voltage to the RRAM indicates that a voltage applied to the upper electrode is greater than a voltage applied to the lower electrode, and applying the reset voltage to the RRAM indicates that a voltage applied to the upper electrode is less than a voltage applied to the lower electrode.

For instance, as shown in FIG. 3, in a case where the set voltage is applied to the RRAM, if forward scanning is performed on the RRAM, that is, when the set voltage gradually increases to 3V from 0V, a voltage-current variation curve of the RRAM is represented by a curve 15. At this point, the resistance value of the RRAM decreases along with the increase of the set voltage. If backward scanning is performed on the RRAM, that is, when the set voltage gradually decreases to 0V from 3V, a voltage-current variation curve of the RRAM is represented by a curve 16. At this point, because the applied voltage is still the forward voltage, the resistance value of the RRAM slowly decreases along with the decreasing of the forward voltage. In the set process, the resistance value of the RRAM will gradually decrease. The curve 16 is above the curve 15.

For instance, as shown in FIG. 3, in a case where the reset voltage is applied to the RRAM, if the forward scanning is performed on the RRAM, that is, when the reset voltage gradually reduces to −3V from 0V, a voltage-current variation curve of the RRAM is represented by a curve 17. At this point, a resistance value of the RRAM increases along with the increase of the reset voltage. If the backward scanning is performed on the RRAM, that is, when the reset voltage gradually increases to 0V from −3V, a voltage-current variation curve of the RRAM is represented by a curve 18. At this point, a resistance value of the RRAM slowly increases along with the decreasing of the reverse voltage. In the reset process, the resistance value of the RRAM will gradually increase. The curve 18 is below the curve 17.

Figure 4:
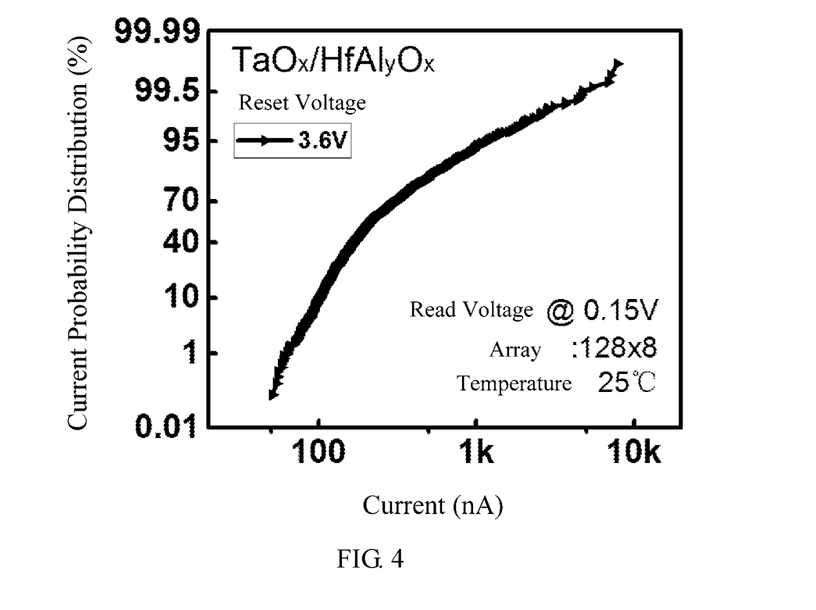
FIG. 4 is a curve diagram illustrating a current accumulation probability distribution of 1024 resistive random access memories when a reset voltage is 3.6V.

For instance, a resistance value of a RRAM has randomness. The variations of resistance values of RRAMs that are identical under the same voltage may be completely different. For instance, FIG. 4 shows a curve illustrating a current accumulation probability distribution of 1024 RRAMs when a reset voltage is 3.6V. Under the same voltage that is lower than an operation threshold, resistance and current have a linear relationship, and the distribution of currents may also represent the distribution of the resistance values of the RRAMs. As shown in FIG. 4, the horizontal coordinate represents the read current of the RRAMs, and the distribution of the currents of the RRAMs is obtained under the read voltage (namely the operation voltage) of, for instance, 0.15V. The vertical coordinate represents the current accumulation probability. The denser the points in a corresponding interval are, the greater the probability that the current will appear in the corresponding interval is.

For instance, a structure of the first RRAM device array 111 and a structure of the second RRAM device array 121 may be the same and may also be different. The embodiment of the present disclosure is not limited thereto. For instance, as shown in FIG. 2, in one example, the structure of the first RRAM device array 111 and the structure of the second RRAM device array 121 are the same. It should be noted that the structure of the first RRAM device array 111 and the structure of the second RRAM device array 121 shown in FIG. 2 are merely exemplary and are not intended to limit the embodiments of the present disclosure. Descriptions will be given below by taking the first RRAM device array 111 as an example.

For instance, the first RRAM device array 111 may be an active matrix array and may also be a passive matrix array. In the passive matrix array, a word line and a bit line are connected at each node of the passive matrix through one first RRAM device and one non-linear element. The non-linear element is configured to allow the first RRAM device to obtain a proper partial pressure, so that information read and written on the first RRAM device array 111 is prevented from being loss, when the first RRAM device is in low-resistance state. The non-linear element may be a diode or other component with determined nonlinearity. In the active matrix array, the word line and the bit line are connected at each node of the active matrix through one first RRAM device and one switching element. The switching element may separately control the first RRAM device to read/write and erase signals, thereby avoiding interference between adjacent first RRAM devices.

For instance, in the embodiment of the present disclosure, both the first RRAM device array 111 and the second RRAM device array 121 may be active matrix arrays. Thus, the first storage circuit unit 11 further includes a plurality of first switching elements, and the plurality of first switching elements are in one-to-one correspondence with the plurality of first RRAM devices. The first address, for instance, may be used for controlling the turn-on or turn-off of each of the plurality of first switching elements, to position the selected first RRAM device 1111. The second storage circuit unit 12 further includes a plurality of second switching elements, and the plurality of second switching elements are in one-to-one correspondence with the plurality of second RRAM devices.

For example, the first switching element and the second switching element may be transistors. The transistors, for example, may be thin film transistors, field effect transistors (such as, MOS field effect transistors) or other switching elements having the same characteristics, and the thin film transistors may include oxide thin film transistor, amorphous silicon thin film transistors, polysilicon thin film transistors, or the like.

For instance, as shown in FIG. 2, in one example, the first RRAM device array 111 may include 128 first word lines $WL_1$ (namely $WL_1 0$-$WL_1 127$), 8 first bit lines $BL_1$ (namely $BL_1 0$-$BL_1 7$) and 128 first source lines $SL_1$, the 8 first bit lines $BL_1$ are intersected with the 128 first word lines $WL_1$ and the 128 first source lines $SL_1$, and a first RRAM device is disposed at each intersection point of the first bit lines $BL_1$ and the first word lines $WL_1$. That is, the first RRAM device array 111 includes first RRAM devices arranged in 128 rows and 8 columns, so the first RRAM device array 111 is a 128×8 matrix array. The second RRAM device array 121 may also include 128 second word lines $WL_2$ (namely $WL_2 0$-$WL_2 127$), 8 second bit lines $BL_2$ (namely $BL_2 0$-$BL_2 7$) and 128 second source lines $SL_2$, the 8 second bit lines $BL_2$ are intersected with the 128 second word lines $WL_2$ and the 128 second source lines $SL_2$, and a second RRAM device is disposed at each intersection point of the second bit lines $BL_2$ and the second word lines $WL_2$. That is, the second RRAM device array 121 also includes second RRAM devices arranged in 128 rows and 8 columns, so the second RRAM device array 121 is also a 128×8 matrix array.

For instance, as shown in FIG. 2, in one example, the first switching element is an N-type transistor, and a gate electrode of a first switching element is connected with a first word line $WL_1$, for instance, when a high level is inputted into the first word line $WL_1$, the first switching element is turned on. A drain electrode of the first switching element is connected in series with a first RRAM device and then connected to a first bit line $BL_1$, and a source electrode of the first switching element is connected with a first source line $SL_1$. The first word line $WL_1$ is used to apply a corresponding driving voltage to the transistor, so as to control the turn-on or turn-off of the transistor. After the transistor is turned on, for instance, a voltage may be applied to the first RRAM device in the first RRAM device array 111 through the first source line $SL_1$ and the first bit line $BL_1$ to change the resistance state of the first RRAM device. For instance, the first RRAM device may be in a low-resistance state by applying a set voltage to the first RRAM device through the first bit line $BL_1$ and the first source line $SL_1$; for another example, the first RRAM device may be in a high-resistance state by applying a reset voltage to the first RRAM device through the first bit line $BL_1$ and the first source line $SL_1$.

For instance, the resistance value of the first RRAM device is relevant to a material and a thickness of the dielectric layer (e.g., a resistive material layer) of the first RRAM device. The resistance value of the first RRAM device may be ranged from several tens of kilohms (KΩ) to several hundreds of kilohms (KΩ).

For instance, in a case of applying the same operation voltage, resistance values of at least two second RRAM devices in the second RRAM device array 121 are different from each other. Thus, the first address circuit 10 can map resistances values of different second RRAM devices in the second RRAM device array 121 to different first addresses, so as to position different selected first RRAM devices 1111.

For instance, in the case of applying the same operation voltage, resistance values of at least two first RRAM devices in the first RRAM device array 111 are different from each other, to obtain different processing results.

For instance, the plurality of first RRAM devices in the first RRAM device array 111 include a plurality of first threshold voltages, and the plurality of second RRAM devices in the second RRAM device array 121 include a plurality of second threshold voltages. The same operation voltage is less than a minimum first threshold voltage among the plurality of first threshold voltages and a minimum second threshold voltage among the plurality of second threshold voltages, thereby ensuring that the resistance value of the first RRAM device and the resistance value of the second RRAM device remain unchanged in an operation process.

For instance, the same operation voltage may be 0.15V. The same operation voltage may be provided by a voltage source.

For instance, the first RRAM device and the second RRAM device may be made from the same material. For instance, a material of the dielectric layer of the first RRAM device and a material of the dielectric layer of the second RRAM device both are compositions of TaOx and HfAlyOx. However, the first RRAM device and the second RRAM device may also be made from different materials. No limitation will be given here in the embodiments of the present disclosure.

Because resistance values of the second RRAM devices in the second RRAM device array 121 need to be mapped to addresses of the first RRAM devices in the first RRAM device array 111, in order to map the resistance values of the second RRAM devices in the second RRAM device array 121 to the addresses of the first RRAM devices in the first RRAM device array 111 as uniformly as possible, the resistance values of the second RRAM devices in the second RRAM device array 121 need to be uniformly distributed within a certain range. Meanwhile, in order to reduce the error rate, the resistance values of the plurality of second RRAM devices shall be distributed as uniformly and discretely as possible.

Figure 5:
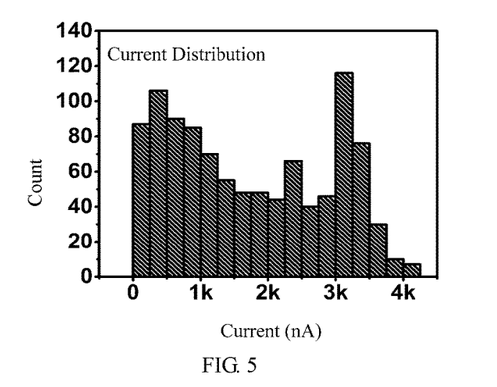
FIG. 5 is a schematic diagram illustrating a distribution of resistance values of respective second RRAM devices in a second RRAM device array according to an embodiment of the present disclosure.

For instance, as shown in FIG. 5, the resistance values of the second RRAM devices in the second RRAM device array 121 are uniformly and discretely distributed within a second predetermined resistance range. For instance, the resistance values of the second RRAM devices in the second RRAM device array 121 may be uniformly and discretely distributed within the second predetermined resistance range by using a method of reset one time and set several times.

For instance, when a reset operation and a set operation are performed on the second RRAM device array 121, firstly, a second reset voltage is applied to all the second RRAM devices in the second RRAM device array 121 through the second bit lines BL2 and the second source lines SL2 for resetting, that is, all the second RRAM devices are in high-resistance states; and subsequently, a plurality of second set voltages are applied to all of the second RRAM devices in the second RRAM device array 121 through the second bit lines BL2 and the second source lines SL2 for setting, that is, the distribution of the resistance values of all the second RRAM devices is gradually expanded to form the second RRAM device array 121, the resistance values of which are uniformly and discretely distributed within the second predetermined resistance range. For instance, the number of the plurality of second set voltages may be 28, but is not limited thereto. The present disclosure does not specifically limit the number of the second set voltages.

For instance, the resistance values of the first RRAM devices in the first RRAM device array 111 are uniformly and discretely distributed within a first predetermined resistance range. For instance, the resistance values of the first RRAM devices in the first RRAM device array 111 may be uniformly and discretely distributed within the first predetermined resistance range by using a method of reset one time and set several times. Therefore, in the first RRAM device array 111, resistance values of only a part of the first RRAM devices are close to a reference resistance value $R_{ref}$, thus contributing to reducing the error rate of the PUF. For instance, the reference resistance value $R_{ref}$ may be a medium value or an average value of the resistance values of all the first RRAM devices. The reference resistance $R_{ref}$ may also be an average value of the first predetermined resistance range. For instance, if the first predetermined resistance range is 30KΩ-300KΩ, the reference resistance value $R_{ref}$ may be 165KΩ.

For instance, when a reset operation and a set operation are performed on the first RRAM device array 111, firstly, a first reset voltage is applied to all of the first RRAM devices in the first RRAM device array 111 through the first bit lines BL1 and the first source lines SL1 for resetting, that is, all of the first RRAM devices are in high-resistance states; and subsequently, a plurality of first set voltages are applied to all the first RRAM devices in the first RRAM device array 111 through the first bit lines BL1 and the first source lines SL1 for setting, that is, the distribution of the resistance values of all the first RRAM devices is gradually expanded to form the first RRAM device array 111, the resistance values of which are uniformly and discretely distributed within the first predetermined resistance range. For instance, the number of the plurality of first set voltages may also be 28, but is not limited thereto. The present disclosure does not specifically limit the number of the first set voltages.

For instance, the first reset voltage can range from 3V to 4V, and the second reset voltage may also range from 3V to 4V. The first reset voltage and the second reset voltage may be same. The first reset voltage and the second reset voltage, for instance, may be both 3.6V. However, the present disclosure is not limited thereto, the first reset voltage and the second reset voltage may also be different. For instance, the first reset voltage is 3V, and the second reset voltage is 3.6V.

For instance, the plurality of first set voltages are all the same, and the plurality of second set voltages are also all the same. The plurality of the first set voltages may range from 1V to 2V, and the plurality of the second set voltages may also range from 1V to 2V. The plurality of first set voltages and the plurality of second set voltages may be same. The plurality of first set voltages and the plurality of second set voltages, for instance, all may be 1.5V. But the present disclosure is not limited thereto; the plurality of first set voltages may also be different from the plurality of second set voltages. For instance, the plurality of first set voltages are 1.3V, and the plurality of second set voltages are 1.6V.

For instance, in one example, the first reset voltage and the first set voltage may be pulse voltages, and the second reset voltage and the second set voltage may also be pulse voltages.

For instance, the first RRAM device and the second RRAM device are made from the same material; the first reset voltage and the second reset voltage are the same, and the plurality of first set voltages and the plurality of second set voltages are also the same, and then the first predetermined resistance range and the second predetermined resistance range may be same.

It should be noted that: although the first predetermined resistance range and the second predetermined resistance range are the same, the resistance values of the first RRAM devices in the first RRAM device array 111 may be different from the resistance values of the second RRAM devices in the second RRAM device array 121, and the resistance values of the first RRAM devices in the first RRAM device array 111 and the resistance values of the second RRAM devices in the second RRAM device array 121 are randomly, uniformly and discretely distributed.

For instance, the first predetermined resistance range and the second predetermined resistance range may also be different. If the first RRAM device and the second RRAM device are formed of different materials, or the first reset voltage and the second reset voltage are different, or the plurality of first set voltages and the plurality of second set voltages are different, the first predetermined resistance range and the second predetermined resistance range may also be different.

For instance, the first predetermined resistance range may be 30KΩ-300KΩ, and the second predetermined resistance range may be 30KΩ-300KΩ.

For instance, the first predetermined resistance range is determined by the resistive material system for forming the first RRAM devices and the thickness of the resistive materials, and the second predetermined resistance range is determined by the resistive material system for forming the second RRAM devices and the thickness of the resistive materials (the resistance value ranges of the RRAM devices formed by the material systems of TiN/TaOx/HfO2/TiN and by the material systems of TiN/TaOx/HfAlyOx/TiN are both 30KΩ-300 KΩ).

For instance, as shown in FIG. 2, the first address circuit 20 includes a row address mapping sub-circuit 201 and a column address mapping sub-circuit 202. The first address may include a first row address (namely a word line) and a first column address (namely a bit line). The row address mapping sub-circuit 201 is configured to generate the first row address, and the column address mapping sub-circuit 202 is configured to generate the first column address. The first row address and the first column address are respectively a row address and a column address of the selected first RRAM device 1111.

For instance, the first address circuit 20 is configured to map resistance values of at least two second RRAM devices in the second RRAM device array 121 to the first address. For instance, one of the two second RRAM devices is mapped to the first row address, and the other is mapped to the first column address.

It should be noted that the first address circuit 20 is configured to map resistance values of a plurality of second RRAM devices (for instance, three second RRAM devices, four second RRAM devices, etc.) in the second RRAM device array 121 to the first address. The present disclosure is not limited thereto.

For instance, as shown in FIG. 1, the first address circuit 20 may include a sense amplifier 203 and/or an analog-to-digital converter 204. The analog-to-digital converter 204 may implement address mapping by adopting a parallel mapping method. The sense amplifier 203 may achieve address mapping by adopting a serial mapping method, and can achieve the address mapping process at a lower hardware cost. But the present disclosure is not limited thereto, the first address circuit 20 may also implement the address mapping process by other methods, which is not limited by the embodiments of the present disclosure.

Figure 6:
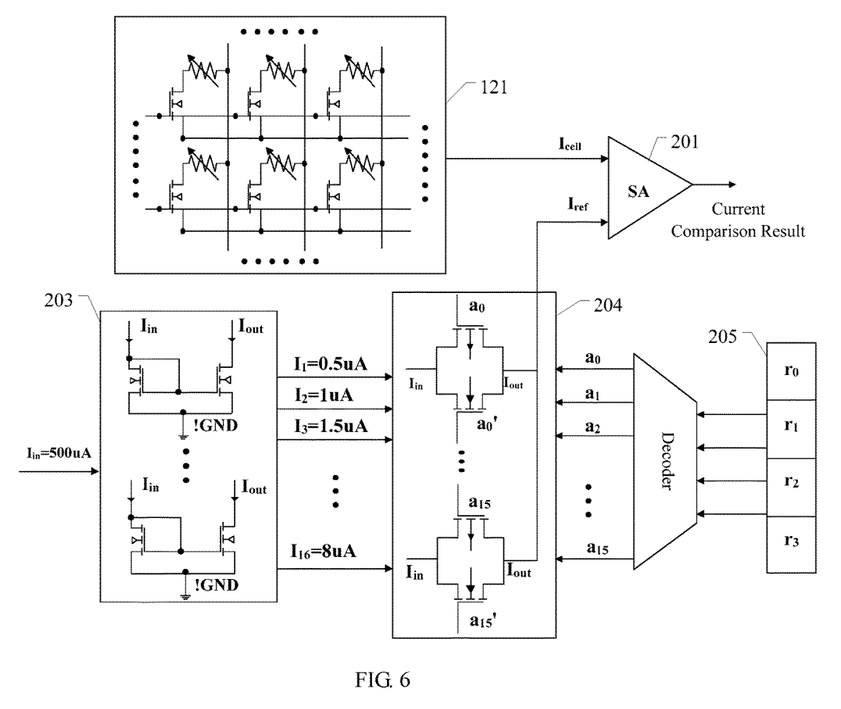
FIG. 6 is a schematic block diagram of a circuit of a sense amplifier used in an address mapping process according to an embodiment of the present disclosure.

For instance, as shown in FIG. 6, an example of the present disclosure illustrates the address mapping process by taking a case that the first address circuit 20 includes the sense amplifier 203 as an example. The first address circuit 20 may include a sense amplifier 203, a current mirror matrix 203, a switch matrix 204 and a control register 205. The current mirror matrix 203 is configured to generate and output a reference current group, and the current mirror matrix 203 may include a cascode current mirror. The switch matrix 204 is configured to output reference currents in the reference current group. The control register 205 is configured to control the switch matrix 204 to output a selected reference current $I_{ref}$ in the reference current group. The sense amplifier 203 is configured to compare a current $I_{cell}$ of the selected second RRAM device with the selected reference current $I_{ref}$ and output a current comparison result. The current comparison result may be a binary number, or a bit of a binary number, and the current comparison result may be 0 or 1.

For instance, in one example, the reference current group may include 16 reference currents. As shown in FIG. 6, the 16 reference currents are respectively $I_1$, $I_2$, $I_3$, . . . , $I_{16}$; $I_1=0.5$ μA, $I_2=1$ μA, $I_3=1.5$ μA, and so on, finally, $I_{16}=8$ μA. The control register 205 includes four control words $r_0$, $r_1$, $r_2$ and $r_3$, and after the four control words are decoded by a decoder, 16 control signals a0, a1, a2 . . . , a15 are formed. The 16 control signals may be in one-to-one correspondence to the 16 reference currents. In the address mapping process, the control register 205 controls the switch matrix 204 to sequentially output the reference currents $I_{ref}$ in the reference current group, and the reference currents $I_{ref}$ vary from large to small until the sense amplifier 203 outputs a high level, that is, when the current comparison result is 1, the address mapping is completed. For instance, if the current $I_{cell}$ of the selected second RRAM device is 5.2 μA, the selected reference current $I_{ref}$ is 5 μA, that is, when the selected reference current $I_{ref}$ is $I_{10}$, the current comparison result is 1, and the address mapping process is ended. Thus, it can be determined that the current $I_{cell}$ of the selected second RRAM device is between $I_{10}$ to $I_{11}$, namely the current $I_{cell}$ of the selected second RRAM device is between 5 μA-5.5 μA.

For instance, a corresponding relationship between different reference current ranges and address information may be preset. For instance, when the current $I_{cell}$ of the selected second RRAM device is between $I_1$ and $I_2$, the current $I_{cell}$ of the selected second RRAM device corresponds to first address information; when the current $I_{cell}$ of the selected second RRAM device is between I3 and I4, the current $I_{cell}$ of the selected second RRAM device corresponds to second address information; and so on. Thus, after a range of the current $I_{cell}$ of the selected second RRAM device is determined, the first address may be determined according to the address information corresponding to the current $I_{cell}$.

For instance, as shown in FIG. 1, the circuit structure for implementing the PUF further comprises a second address circuit 40. The second address circuit 40 is configured to receive a second address and position a selected second RRAM device according to the second address. The first address circuit 20 is configured to map a resistance value of the selected second RRAM device to the first address.

For instance, as shown in FIG. 2, the second address circuit 40 may receive a group of second addresses, and the group of second addresses comprises two second addresses which are respectively a second address A1 and a second address A2 as shown in FIG. 2. The second address A1, for instance, may be used for positioning a selected second RRAM device 1211, and the second address A2 may be used for positioning a selected second RRAM device 1212. The row address mapping sub-circuit 201 is configured to map the selected second RRAM device 1212 to the first row address, and the column address mapping sub-circuit 202 is configured to map the selected second RRAM device 1211 to the first column address.

For instance, the second address may be randomly selected from a backstage database.

For instance, the second address circuit 40 includes a row address decoding sub-circuit 401 and a column address decoding sub-circuit 402. The row address decoding sub-circuit 401 is configured to decode row address information in the second address, to convert the row address information into a specific second row address. The column address decoding sub-circuit 402 is configured to decode column address information in the second address, to convert the column address information into a specific second column address. The second row address and the second column address may be respectively a row address and a column address of the selected second RRAM device.

For instance, the second address circuit 40 may be configured to adopt a single decoding method and may also be configured to adopt a double decoding method to achieve address decoding.

For instance, as shown in FIG. 1, the output circuit 30 may include a comparison sub-circuit 301. The comparison sub-circuit 301 is configured to compare the resistance value $R_s$ of the selected first RRAM device 1111 with a reference resistance value $R_{ref}$ and output a resistance comparison result, and the resistance comparison result is the processing result.

For instance, the reference resistance $R_{ref}$ corresponds to a group of second addresses.

For instance, the reference resistance $R_{ref}$ may also be selected from the backstage database.

For instance, according to Ohm's law, under the same voltage, a resistance value is linearly inversely proportional to a current. Therefore, the comparison sub-circuit 301 may be configured to compare, under same voltage, a current flowing through the selected first RRAM device 1111 with a current flowing through a resistor having the reference resistance value $R_{ref}$, to obtain a resistance comparison result. For instance, the same voltage is lower than an operation threshold voltage of the selected first RRAM device 1111.

For instance, the resistance comparison result may be a binary number or a bit of a binary number. For instance, the resistance comparison result may be 0 or 1.

For instance, the comparison sub-circuit 301 may be implemented by a hardware circuit. The comparison sub-circuit 301, for instance, may be constituted by elements such as a transistor, a resistor, a capacitor, an amplifier and the like. For another example, the comparison sub-circuit 301 may also be implemented by a signal processor such as a field programmable gate array (FPGA), a digital signal processor (DSP), a CMU or the like. The comparison sub-circuit 301, for instance, may include a processor and a memory, and the processor executes software programs stored in the memory to achieve a function of comparing the resistance value $R_s$ of the selected first RRAM device 1111 with the reference resistance value $R_{ref}$.

It should be noted that the above relevant description of the first RRAM device is also applicable to the second RRAM device without conflict.

An embodiment of the present disclosure further provides an integrated circuit (IC) chip, which comprises the circuit structure for implementing the PUF according to any one of the above embodiments.

The IC chip provided by the embodiment of the present disclosure can implement hardware authentication through the circuit structure for implementing the PUF, improve the data complexity, improve the capability of the IC chip in resisting attacks by machine learning algorithm, and increase the security of hardware authentication.

For instance, the PUFs may be divided into strong PUFs and weak PUFs according to the number of the CRPs (the challenge response pairs). The strong PUF generally has a huge number of CRPs (some strong PUFs have an infinite number of CRPs). The strong PUF may be embedded into the IC chip and used to authenticate the IC chip.

For instance, when the IC chip is shipped from the factory, a huge number of CRPs may be extracted in advance and stored in the database. During an authentication process, firstly, a challenge signal is randomly selected from the database and sent to an IC chip to be authenticated, and the IC chip to be authenticated acquires an actual response signal according to the challenge signal. Subsequently, the actual response signal is compared with a target response signal in the database, and if the actual response signal is the same as the target response signal, the IC chip to be authenticated is determined to pass the authentication.

For instance, the IC chip may be an application specific IC chip, a standard general-purpose IC chip, etc. The IC chip may be embedded into hardware, which needs to be authenticated, such as bank cards and smart cards.

It should be noted that, for the detailed descriptions of the circuit structure for implementing the PUF, reference may be made to the embodiment of the circuit structure for implementing the PUF, and details are not repeated herein.

Figure 7:
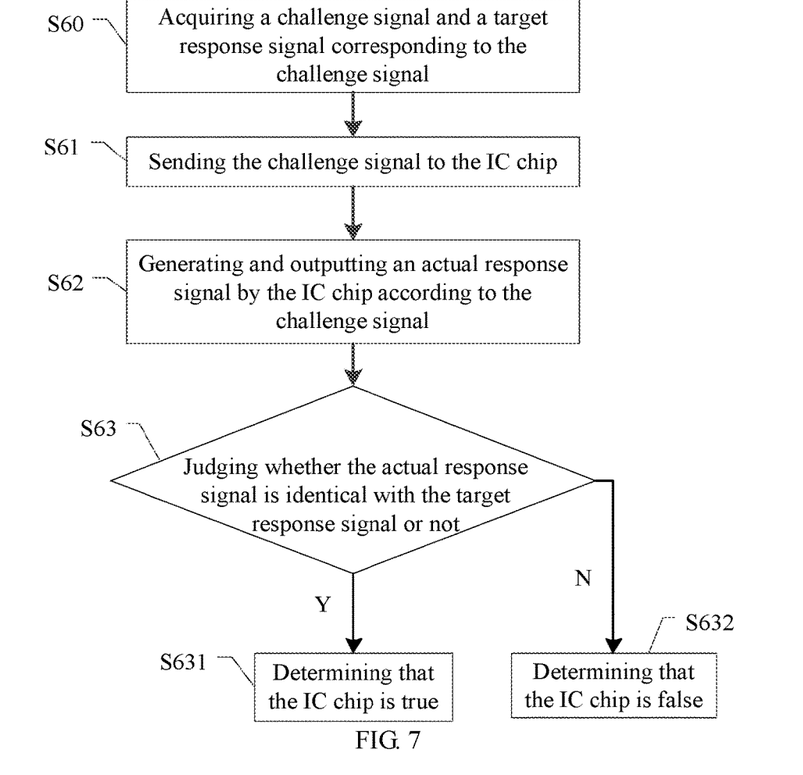
FIG. 7 is a schematic flowchart of an authentication method of an integrated circuit chip provided by an embodiment of the present disclosure.
Figure 8:
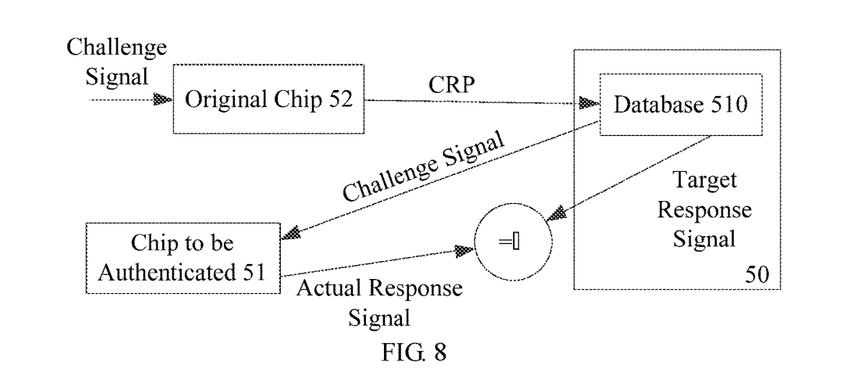
FIG. 8 is a schematic block diagram of an authentication method of the integrated circuit chip provided by an embodiment of the present disclosure.

FIG. 7 is a schematic flowchart of an authentication method of an integrated circuit chip provided by an embodiment of the present disclosure, and FIG. 8 is a schematic block diagram of an authentication method of the integrated circuit chip provided by an embodiment of the present disclosure.

For instance, the authentication method of the IC chip provided by the embodiment of the present disclosure may be applied to the IC chip according to any one of the above embodiments. As shown in FIG. 7, the authentication method of the IC chip may comprise following steps:

S60: acquiring a challenge signal and a target response signal corresponding to the challenge signal;

S61: sending the challenge signal to the IC chip;

S62: generating and outputting an actual response signal by the IC chip according to the challenge signal; and S63: judging whether the actual response signal is identical with the target response signal or not.

In the step S63, if the actual response signal is identical with the target response signal, a step S631 is performed, that is, the authentication is successful, and the IC chip is determined to be true; and if the actual response signal is different from the target response signal, a step S632 is performed, that is, the authentication fails, and the IC chip is determined to be false.

The authentication method of the IC chip provided by the embodiment of the present disclosure can improve the security and the reliability level of the IC chip, and can be widely applied to various fields where identity authentication is required.

For instance, the challenge signal and the target response signal corresponding to the challenge signal form a CRP. The CRP may be stored in the database, and the database is disposed on an authentication server.

For instance, as shown in FIG. 8, before the authentication method provided by the embodiment of the present disclosure is performed, CRPs of an original chip 51 may be extracted, and are stored into a database 510 of an authentication server 50 for use in the authentication process. If a chip to be authenticated 51 is the original chip 52, the same challenge signal is inputted, actual response signals generated by the chip to be authenticated 51 and the original chip 50 are the same. Therefore, in the authentication process, firstly, a CRP is selected from the database 510; a challenge signal of the CRP is input to the chip to be authenticated 51; and the chip to be authenticated 51 generates and outputs an actual response signal. Subsequently, the actual response signal is compared with a target response signal in the selected CRP, if the chip to be authenticated 51 is the original chip 52, the actual response signal is the same as the target response signal, and the authentication succeeds. If the chip to be authenticated 51 is another IC chip, the actual response signal is different from the target response signal, and the authentication fails.

It should be noted that CRPs of a plurality of IC chips may be stored into the database 510, and each IC chip may correspond to identification information. In the authentication process, the CRP corresponding to the chip to be authenticated 51 may be obtained according to the identification information of the chip to be authenticated 51, and then authentication can be performed.

For instance, the challenge signal includes the second address in the embodiment of the above-described circuit structure for implementing the PUF, and the actual response signal includes the processing result in the embodiment of the above-described circuit structure for implementing the PUF. For instance, the challenge signal includes a plurality of second addresses, and the actual response signal includes a plurality of processing results. The processing result may be a binary number or a bit of a binary number. And the actual response signal may be a plurality of binary numbers or a plurality of bits of a binary number obtained by combining the plurality of processing results. For instance, when the actual response signal comprises a plurality of binary numbers, the target response signal also comprises a plurality of binary numbers, so the reliability of chip authentication can be improved.

It should be noted that a process, that the IC chip generates and outputes the actual response signal according to the challenge signal, may be referred to relevant descriptions of the address mapping process in the embodiment of the circuit structure for implementing the PUF.

Figure 9:
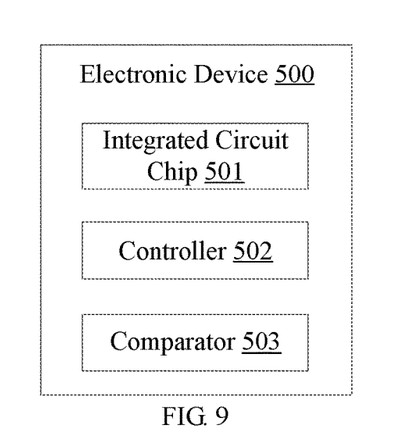
FIG. 9 is a schematic block diagram of an electronic device provided by an embodiment of the present disclosure.

FIG. 9 is a schematic block diagram of an electronic device provided by an embodiment of the present disclosure.

For instance, as shown in FIG. 9, the electronic device 500 may comprise a controller 502, a comparator 503 and the IC chip 501 described in any one of the above embodiments. These components are connected with each other through a bus system (not shown) and/or connecting mechanisms of other forms. It should be noted that the electronic device may further comprise other components and structures according to actual needs.

For instance, the controller 502 is configured to control the authentication server to acquire and obtain a CRP, that is, a challenge signal and a target response signal corresponding to the challenge signal. The IC chip 501 is configured to receive the challenge signal, and generate and output an actual response signal according to the challenge signal. The comparator 503 is configured to receive the target response signal and the actual response signal, compare the target response signal with the actual response signal, and output a response signal comparison result. If the target response signal is the same as the actual response signal, the response signal comparison result is true, that is, the IC chip 501 passes the authentication. If the target response signal is different from the actual response signal, the response signal comparison result is false, that is, the IC chip 501 does not pass the authentication.

For instance, the controller 502 may randomly select a CRP (including a challenge signal and a corresponding target response signal) from the database, and then send the CPR to the IC chip 501 for an authentication operation. For instance, the detailed description of the challenge signal and the target response signal may be referred to the relevant description in the above authentication method.

For instance, both the controller 502 and the comparator 503 can be implemented by software, hardware, firmware or any combination thereof, and specific implementations (e.g., software programming, FPGA programming, etc.) will not be described in detail herein.

Figure 10:
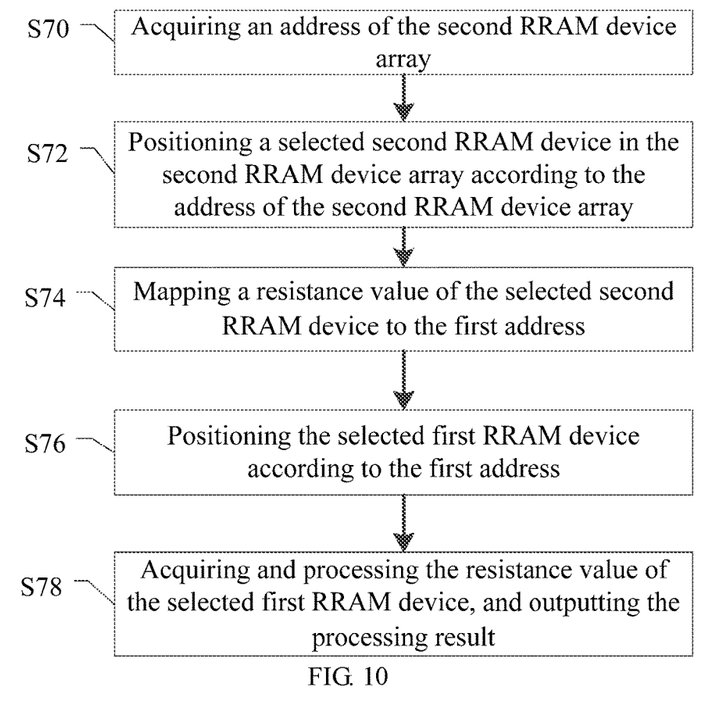
FIG. 10 is a schematic flowchart of a driving method of a circuit structure for implementing the physical unclonable function provided by an embodiment of the present disclosure.

FIG. 10 is a schematic flowchart of a driving method of the above-described circuit structure for implementing the physical unclonable function provided by an embodiment of the present disclosure.

For instance, as shown in FIG. 10, the driving method comprises following steps:

S70: acquiring an address of the second RRAM device array;

S72: positioning a selected second RRAM device in the second RRAM device array according to the address of the second RRAM device array;

S74: mapping a resistance value of the selected second RRAM device to the first address;

S76: positioning the selected first RRAM device according to the first address; and S78: acquiring and processing the resistance value of the selected first RRAM device, and outputting the processing result.

For instance, in the step S70, addresses of a plurality of (e.g., two) second RRAM devices in the second RRAM device array may be obtained. The address of the second RRAM device array, for instance, may be the second address in the embodiment of the above-described circuit structure for implementing the PUF.

For instance, in the step S72, a plurality of (e.g., two) selected second RRAM devices may be positioned according to the acquired addresses of the plurality of second RRAM devices.

For instance, in one example, the step S74 may include:

S741: applying a same operation voltage to the selected second RRAM device;

S742: comparing a current flowing through the selected second RRAM device with a reference current group to obtain a current comparison result; and S743: determining the first address according to the current comparison result.

For instance, the plurality of first RRAM devices in the first RRAM device array include a plurality of first threshold voltages, and the plurality of second RRAM devices in the second RRAM device array include a plurality of second threshold voltages. The same operation voltage is less than a minimum first threshold voltage among the plurality of first threshold voltages and a minimum second threshold voltage among the plurality of second threshold voltages, thereby ensuring that the resistance value of the first RRAM device and the resistance value of the second RRAM device remain unchanged in an operation process. The same operation voltage, for instance, may be 0.15V.

For instance, the detailed description of the step S743 may be referred to the relevant description in the embodiment of the circuit structure for implementing the PUF.

For instance, in the step S76, the first address may include a first row address and a first column address. The number of the selected second RRAM devices may be two. One of the two selected second RRAM devices is mapped to the first row address, and the other of the two selected second RRAM devices is mapped to the first column address. Therefore, the selected first RRAM device can be positioned according to the first row address and the first column address.

For instance, in one example, the step S78 may include:

S781: acquiring the resistance value of the selected first RRAM device and a reference resistance value;

S782: comparing the resistance value of the selected first RRAM device with the reference resistance value to obtain a resistance comparison result; and S783: outputting the resistance comparison result.

For instance, the resistance comparison result is the processing result. The processing result, for instance, may be a binary number or a bit of a binary number. For instance, the processing result may be 0 or 1.

It should be noted that the detailed descriptions of the address mapping, the reference resistance value, the selected first RRAM device, the selected second RRAM device, the processing result, the resistance comparison result and the like may be referred to relevant descriptions in the embodiment of the circuit structure for implementing the PUF, and similar descriptions will be omitted here.

For the present disclosure, the following statements should be noted:

(1) the accompanying drawings of the embodiment(s) of the present disclosure involve only the structure(s) in connection with the embodiment(s) of the present disclosure, and other structure(s) can be referred to common design(s); and (2) in case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. A circuit structure for implementing a physical unclonable function, comprising: a multilayer circuit, a first address circuit and an output circuit,
    wherein the multilayer circuit comprises a first storage circuit unit and a second storage circuit unit; the first storage circuit unit comprises a first RRAM device array which is addressable; the second storage circuit unit comprises a second RRAM device array which is addressable;
    the first address circuit is configured to map a resistance value of a second RRAM device in the second RRAM device array to a first address; the first address is used for positioning a selected first RRAM device; and
    the output circuit is configured to acquire and process a resistance value of the selected first RRAM device and output a processing result.

2. The circuit structure for implementing the physical unclonable function according to claim 1, wherein the first address circuit is configured to map resistance values of at least two second RRAM devices in the second RRAM device array to the first address.

3. The circuit structure for implementing the physical unclonable function according to claim 1, wherein resistance values of respective first RRAM devices in the first RRAM device array are uniformly and discretely distributed within a first predetermined resistance range; and
    resistance values of respective second RRAM devices in the second RRAM device array are uniformly and discretely distributed within a second predetermined resistance range.

4. The circuit structure for implementing the physical unclonable function according to claim 1, wherein the first address comprises a first row address and a first column address.

5. The circuit structure for implementing the physical unclonable function according to claim 4, wherein the first address circuit comprises a row address mapping sub-circuit and a column address mapping sub-circuit;
the row address mapping sub-circuit is configured to generate the first row address; and
the column address mapping sub-circuit is configured to generate the first column address.

6. The circuit structure for implementing the physical unclonable function according to claim 1, wherein the first address circuit comprises a sense amplifier and/or an analog-to-digital converter.

7. The circuit structure for implementing the physical unclonable function according to claim 6, wherein the analog-to-digital converter is configured to adopt a parallel mapping method to implement address mapping; and the sense amplifier is configured to adopt a serial mapping method to implement address mapping.

8. The circuit structure for implementing the physical unclonable function according to claim 1, wherein the output circuit comprises a comparison sub-circuit,
the comparison sub-circuit is configured to compare the resistance value of the selected first RRAM device with a reference resistance value and output a resistance comparison result, and the resistance comparison result is the processing result.

9. The circuit structure for implementing the physical unclonable function according to claim 1, further comprising a second address circuit,
wherein the second address circuit is configured to receive a second address and position a selected second RRAM device according to the second address; and
the first address circuit is configured to map a resistance value of the selected second RRAM device to the first address.

10. The circuit structure for implementing the physical unclonable function according to claim 1, wherein in a case of applying a same operation voltage, resistance values of at least two first RRAM devices in the first RRAM device array are different from each other, and
resistance values of at least second RRAM devices in the second RRAM device array are different from each other.

11. The circuit structure for implementing the physical unclonable function according to claim 10, wherein the first RRAM device array comprises a plurality of first threshold voltages, and the second RRAM device array comprises a plurality of second threshold voltages; and
the same operation voltage is less than a minimum first threshold voltage among the plurality of first threshold voltages and a minimum second threshold voltage among the plurality of second threshold voltages.

12. The circuit structure for implementing the physical unclonable function according to claim 3, further comprising a second address circuit,
wherein the second address circuit is configured to receive a second address and position a selected second RRAM device according to the second address; and
the first address circuit is configured to map a resistance value of the selected second RRAM device to the first address.

13. An integrated circuit chip, comprising the circuit structure for implementing the physical unclonable function according to claim 1.

14. An electronic device, comprising the integrated circuit chip according to claim 13.

15. The electronic device according to claim 14, further comprising a controller,
wherein the controller is configured to control to output a challenge signal; and
the integrated circuit chip is configured to receive the challenge signal, and generate and output an actual response signal according to the challenge signal.

16. The electronic device according to claim 15, further comprising a comparator,
wherein the controller is further configured to control to output a target response signal corresponding to the challenge signal; and
the comparator is configured to:
receive the target response signal and the actual response signal,
compare the target response signal with the actual response signal, and
output a response signal comparison result.

17. An authentication method of an integrated circuit chip, applied to the integrated circuit chip according to claim 13, comprising:
acquiring a challenge signal and a target response signal corresponding to the challenge signal;
sending the challenge signal to the integrated circuit chip;
generating and outputting an actual response signal by the integrated circuit chip according to the challenge signal; and
judging whether the actual response signal is identical with the target response signal or not, if so, determining that the integrated circuit chip is true, and if not, determining that the integrated circuit chip is false.

18. A driving method of a circuit structure for implementing the physical unclonable function, the circuit structure comprising: a multilayer circuit, a first address circuit and an output circuit, wherein the multilayer circuit comprises a first storage circuit unit and a second storage circuit unit; the first storage circuit unit comprises a first RRAM device array which is addressable; the second storage circuit unit comprises a second RRAM device array which is addressable; the first address circuit is configured to map a resistance value of a second RRAM device in the second RRAM device array to a first address; the first address is used for positioning a selected first RRAM device; and the output circuit is configured to acquire and process a resistance value of the selected first RRAM device and output a processing result, the driving method comprising:
acquiring an address of the second RRAM device array;
positioning a selected second RRAM device in the second RRAM device array according to the address of the second RRAM device array;
mapping a resistance value of the selected second RRAM device to the first address;
positioning the selected first RRAM device according to the first address; and
acquiring and processing the resistance value of the selected first RRAM device, and outputting the processing result.

19. The driving method according to claim 18, wherein mapping the resistance value of the selected second RRAM device to the first address comprises:
applying a same operation voltage to the selected second RRAM device;

comparing a current flowing through the selected second RRAM device with a reference current group to obtain a current comparison result; and determining the first address according to the current comparison result.

20. The driving method according to claim 18, wherein acquiring and processing the resistance value of the selected first RRAM device comprises:

acquiring the resistance value of the selected first RRAM device and a reference resistance value;

comparing the resistance value of the selected first RRAM device with the reference resistance value to obtain a resistance comparison result; and outputting the resistance comparison result, the resistance comparison result being the processing result.

* * * * *